Jan. 15, 1963 L. R. SCHUESSLER 3,073,509
MAILING UNIT
Filed Jan. 30, 1961 10 Sheets-Sheet 1

INVENTOR
LEVYN R. SCHUESSLER
BY Cohn and Powell
ATTORNEYS

Jan. 15, 1963     L. R. SCHUESSLER     3,073,509
MAILING UNIT

Filed Jan. 30, 1961                                   10 Sheets-Sheet 3

INVENTOR
LEVYN R. SCHUESSLER
BY Cohn and Powell
ATTORNEYS

Jan. 15, 1963  L. R. SCHUESSLER  3,073,509
MAILING UNIT
Filed Jan. 30, 1961  10 Sheets-Sheet 4

INVENTOR
LEVYN R. SCHUESSLER

BY Cohn and Powell
ATTORNEYS

Jan. 15, 1963 L. R. SCHUESSLER 3,073,509
MAILING UNIT
Filed Jan. 30, 1961 10 Sheets-Sheet 10

FIG. 21.

INVENTOR
LEVYN R. SCHUESSLER

BY Cohn and Powell
ATTORNEYS

United States Patent Office 3,073,509
Patented Jan. 15, 1963

3,073,509
MAILING UNIT
Levyn Ray Schuessler, University City, Mo.
(6939 Waterman Ave., St. Louis 30, Mo.)
Filed Jan. 30, 1961, Ser. No. 85,838
13 Claims. (Cl. 229—73)

This invention relates generally to improvements in mailing units, and more particularly to improved units of this type adapted for use by utilities and fiscal agents such as banks.

A mailing unit of this general type available for fiscal agents is disclosed and claimed in U.S. Pat. No. 2,964,232 issued December 13, 1960 to the present applicant and entitled "Mailing Unit."

It is an important object of the present invention to provide a mailing unit including a ticket divided into an original portion and a duplicate portion, and an envelope of special construction, which will result in considerable economy for the user.

An important object is achieved by the provision of particularly spaced and located address sections on the ticket and of correspondingly spaced and located windows in an envelope, which afford a considerable financial saving in the cost of printing envelopes by a user of such mailing units.

Still another important objective is realized by providing mailing units that can be effectively and efficiently used by banks or other fiscal agents in handling check-by-mail or deposit-by-mail accounts.

Yet another important object is achieved by the provision of a transverse strip on the original portion of the ticket which can serve as a magnetic ink strip or a space to record information, and thereby expedite handling and processing of the customer's account.

Other important advantages are realized by using special envelopes that have an elongate window positioned to show the strip when the ticket is mailed by the customer so that the user may employ automatic sorters or other electronic equipment to handle or record from the information contained on the strip without removing the ticket from the envelope.

An important object is afforded by one of the units in that it is particularly adapted for advantageous use by utilities.

The foregoing and numerous other objects and advantages of the invention will more clearly appear from the following detailed description of a preferred embodiment and modifications thereof, particularly when considered in connection with the accompanying drawings, in which:

Referring now by characters of reference to the drawings, and first to FIGS. 1–5 inclusive that refer to a deposit ticket 10 used in a mailing unit designated Plan 1, it will be seen that such deposit ticket 10 consists of a single sheet folded in half so that one part overlies the other part and so that the folded edge provides the top margin 11. The uppermost part of the folded deposit ticket 10 is referred to as the original portion or deposit portion 12, while the underlying part is referred to as the duplicate portion or receipt portion 13.

Figure 2:
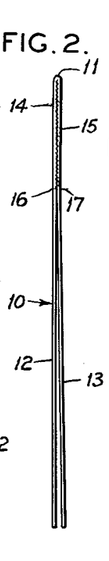
FIG. 2 is an end view of Plan 1 deposit ticket as seen from the right of FIG. 1.

That part of the deposit portion 12 immediately adjacent the upper fold margin 11 constitutes a top stub 14. A corresponding region of the underlying receipt portion 13 is called a top stub 15. As is best illustrated in FIG. 2, the top stubs 14 and 15 are glued together to provide a unitary structure.

Figure 1:
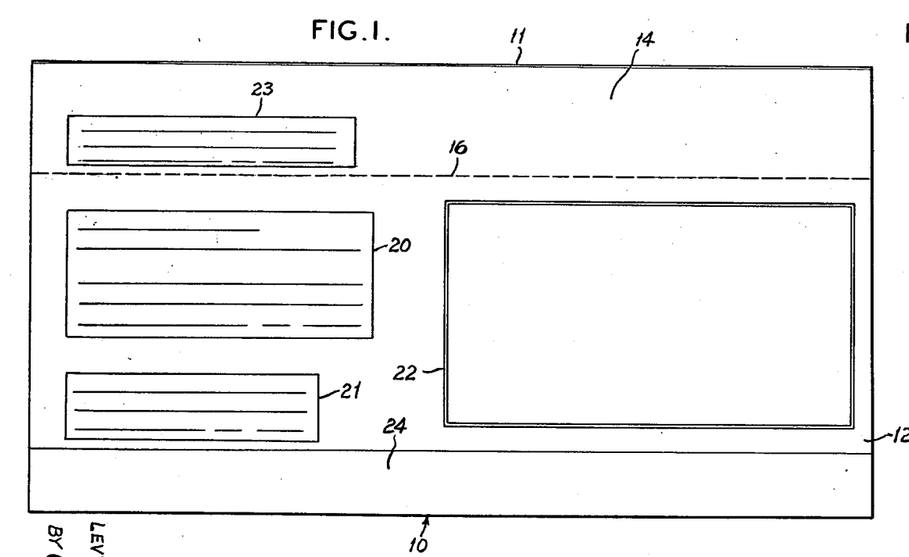
FIG. 1 is a top plan view of a deposit ticket used in a mailing unit hereinafter designated Plan 1.

The deposit portion is provided with a fold-tear line 16 along the bottom of top stub 14. The receipt portion 13 is provided with a fold line 17 along the bottom of its top stub 15.

Figures 4, 5:
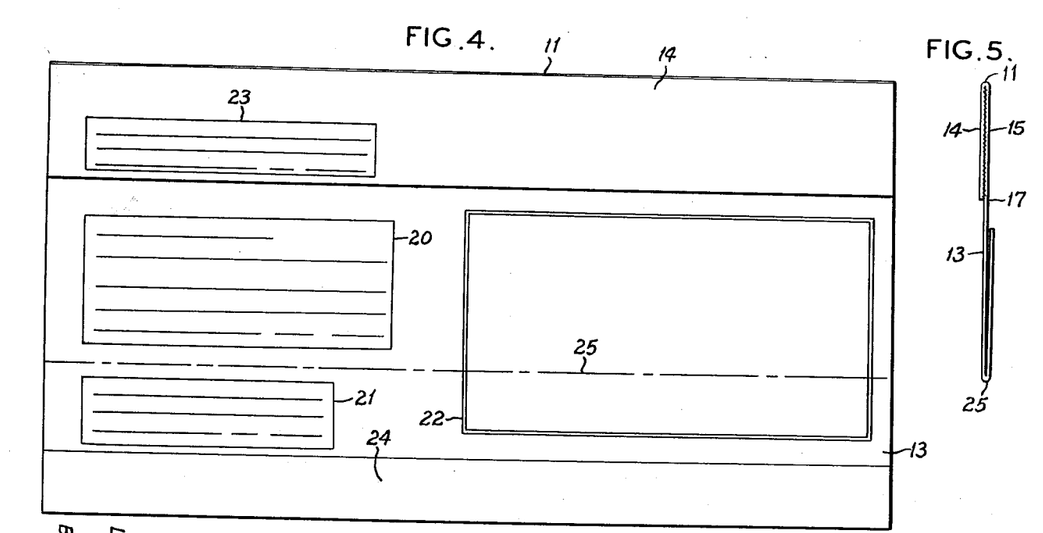
FIG. 4 is a top plan view of the duplicate portion of the Plan 1 deposit ticket.
FIG. 5 is an end view of the duplicate portion as seen from the right of FIG. 4, but with the bottom edge folded under for mailing.

From the top plan views of the deposit portion 12 in FIG. 1 and of the receipt portion 13 in FIG. 4, it is seen that they are provided with depthwise aligned and corresponding address sections. For example, the deposit portion 12 and the receipt portion 13 each include a depositor section 20 immediately below the respective top stubs 14 and 15, such depositor section 20 being adapted to receive the name and address of the depositor as well as any other information essential to the expeditious handling the deposit. Located immediately below the depositor section 20 and at the same end of each ticket portion is a depository section 21 adapted to receive the name and address of the depository. Located at the other end of each ticket portion below the respective top stubs 14 and 15 is a deposit section 22 adapted to receive deposit entries.

On the top stub 14 of deposit portion 12 at one end immediately above the depositor section 20 is a second depository section 23 adapted to receive the name and address of the depositor.

Along the bottom edge of the deposit portion 12 there is provided a transverse strip 24 below the depository section 21 and the deposit section 22. The transverse strip 24 on the deposit portion 12 is provided primarily to serve as a magnetic ink strip, but it can be used for the insertion of machine-recorded bank symbols or other information. The receipt portion 13 is provided with a similar transverse strip 24 that can be used for the insertion of machine-recorded acknowledgments or other information.

The receipt portion 13, as is best shown in FIG. 4, is provided with a transverse fold line 25 spaced upwardly from the bottom edge of such receipt portion. The purpose and functional advantage realized by the fold line 25 will become apparent upon subsequent description.

A customer utilizing the mailing unit of Plan 1 will fill in his name and address in depositor section 20 and fill in the deposit entries in the deposit portion 22 on the original or deposit portion 12. If the bank's name and address does not already appear in the depositor sections 21 and 23 (they will usually be imprinted by the bank), the customer will fill in these sections accordingly. Because the essential sections 20, 21 and 22 are aligned depthwise, the information appearing in these sections will also be reproduced by carbon if desired on the receipt portion 13.

Figure 3:
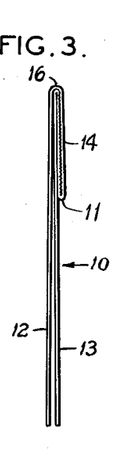
FIG. 3 is an end view of Plan 1 deposit ticket as seen from the right of FIG. 1, but showing the top stubs folded under for mailing.

The customer then folds the top stubs 14 and 15 under the ticket 10 about the fold-tear line 16 and the fold line 17, as is best shown in FIG. 3. The folded ticket is then inserted into a bottom-open envelope 26 illustrated in FIG. 19. A bottom-open envelope 26 is utilized because the folded edge of the ticket 10 is inserted first in order to facilitate insertion. The envelope 26 includes an addressee window 27 at one end adapted to show the depository section 21 on the deposit portion 12. In addition, the envelope 26 includes an addressor window 30 at the same end above the addressee window 27 adapted to show the depositor section 20 on the deposit portion 12. The envelope 26 with the enclosed ticket 10 is then mailed to the bank by the customer.

Figure 19:
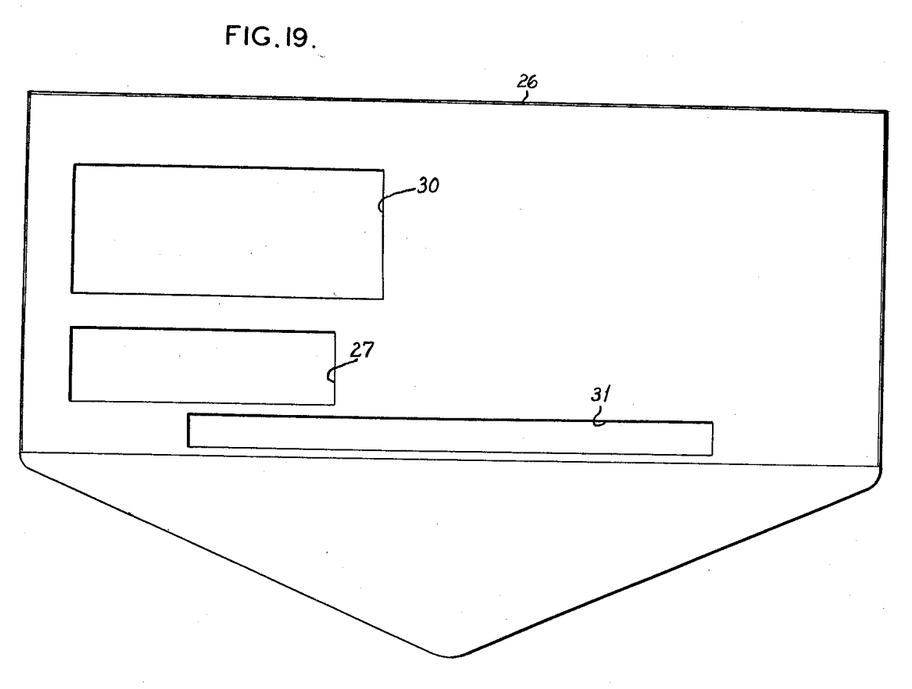
FIG. 19 is a top plan view of an envelope used by the depositor in mailing to the bank.

Under some circumstances, the envelope 26 will include a third elongate window 31 adjacent one edge immediately below the addressee window 27. The third window 31 is positioned to show the information or magnetic ink characters carried in the transverse strip 24 on the deposit portion 12. This feature enables the bank to use an automatic sorter to handle and distribute the deposit tickets to appropriate departments or even to record information from the deposit ticket without removing the ticket from the envelope.

Figure 18:
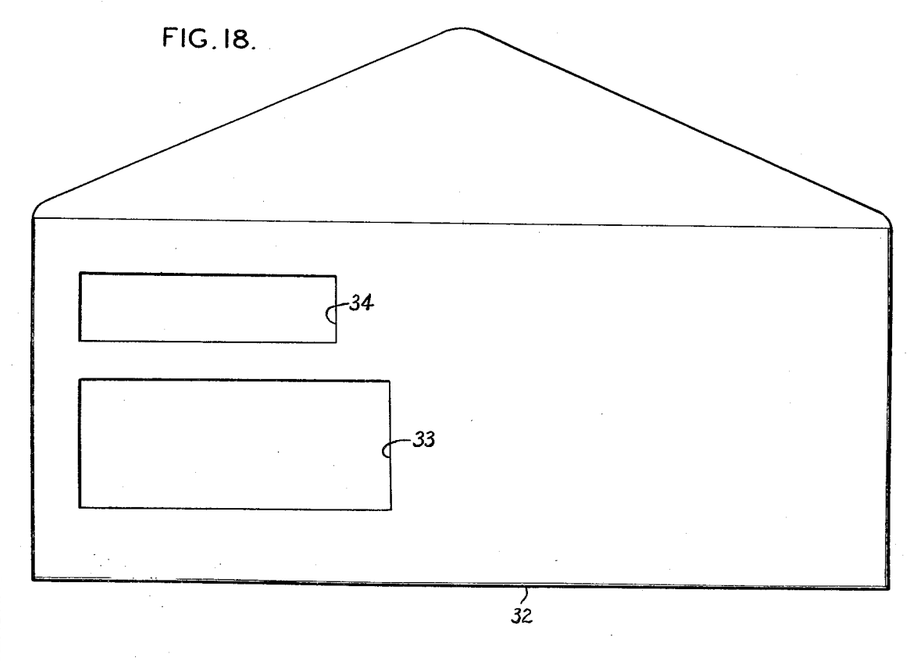
FIG. 18 is a top plan view of an envelope used by the bank in mailing to the depositor.

The bank, after it processes the customer's account, tears the deposit portion along the fold-tear line 16, and sends the receipt portion 13 back to the customer. The bank folds the bottom edge of the receipt portion 13 under along the fold line 25 as is illustrated in FIG. 5. This folded receipt portion 13 is then inserted into an appropriate envelope 32 (FIG. 18) having an addressee window 33 positioned to show the depositor's section 20 on the receipt portion 13 and an addressor window 34 positioned thereabove to show the depository section 23 on the top stub 14 that remains attached to and is now considered a part of the receipt portion 13.

It will be noted that the depositor section 20 on the deposit portion 12 and the depositor section 20 on the receipt portion 13 are filled in simultaneously by the customer. However, the depositor section 20 on the deposit portion 12 is utilized to show through an addressor window when the ticket is mailed by the customer to the bank, and the depositor section 20 on the receipt portion 13 is adapted to show through an addressee window in an envelope when sent by the bank back to the customer.

Figure 6:
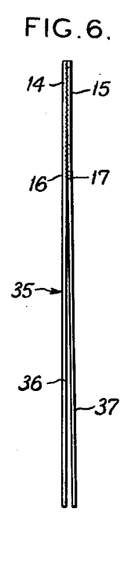
FIG. 6 is an end view of a deposit ticket used in a mailing unit hereinafter designated Plan 2, similar to FIG. 2 above, but showing that the ticket is formed of separate sheets.

Another deposit ticket referred to at 35 in FIG. 6 is adapted for use in a mailing unit designated Plan 2. The deposit ticket 35 is constructed exactly as is the deposit ticket 10 (FIGS. 1–5 inclusive) having a deposit portion 36 and a receipt portion 37, and is utilized in exactly the same manner, the only difference being that the ticket 35 is constructed initially of two separate sheets instead of a single sheet.

Figure 7:
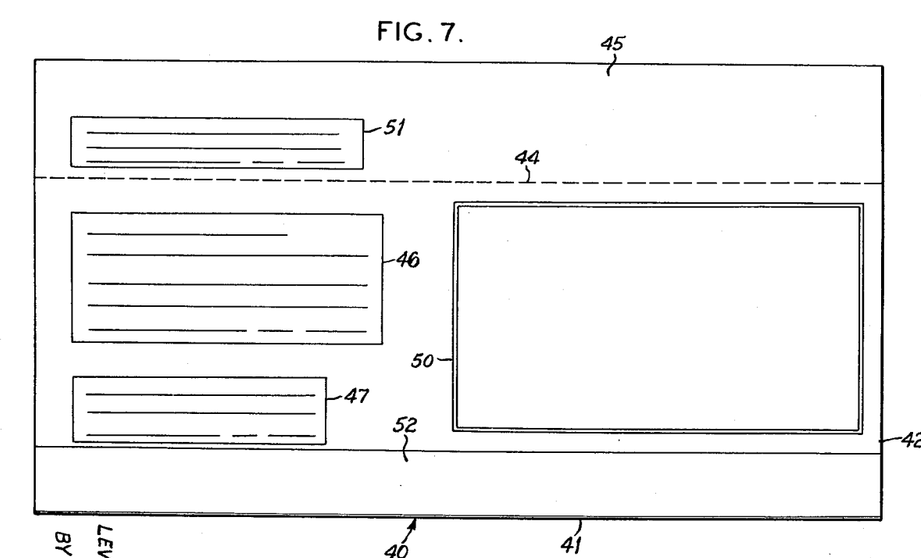
FIG. 7 is a top plan view of a deposit ticket used in a mailing unit hereinafter designated Plan 3.
Figure 8:
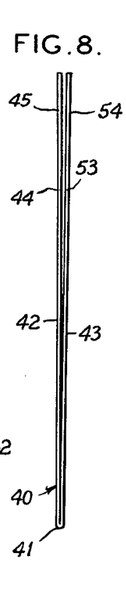
FIG. 8 is an end view of the Plan 3 deposit ticket as seen from the right of FIG. 7.

Another deposit ticket referred to at 40 in FIG. 7 is utilized in a mailing unit designated Plan 3, the ticket 40 being constructed of a single sheet folded along a fold-tear line 41 constituting the bottom margin of the ticket. The uppermost part of ticket 40 constitutes the original or deposit portion 42 while the underlying part constitutes the duplicate or receipt portion 43.

The deposit portion 42 is provided with a fold line 44 spaced from its upper edge to provide a top stub 45. A depositor section 46 is provided at one end of the deposit portion 42 immediately below the fold line 44 adapted to receive the name and address of the depositor. At the same end of the deposit portion 42 and below the depositor section 46, there is provided a depository section 47 adapted to receive the name and address of the depository. At the opposite end of the deposit portion 42 below the fold line 44 is a deposit section 50 adapted to receive deposit entries. Provided on the top stub 45 above the depositor section 46 is a second depository section 51 adapted to receive the name and address of the depositor. A transverse strip 52 is provided along the bottom edge of the deposit portion 42 adjacent the fold-tear line 41, yet below the first depository section 47 and the deposit section 50, the strip 52 being adapted to serve as a magnetic ink strip or a space to receive machine-recorded information.

Figures 10, 11:
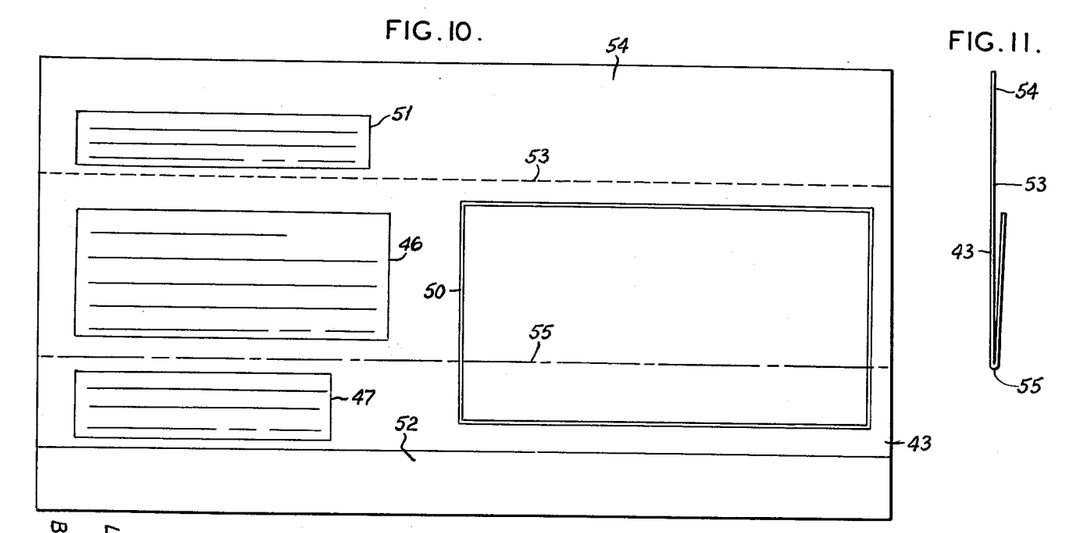
FIG. 10 is a top plan view of the duplicate portion of the Plan 3 deposit ticket.
FIG. 11 is an end view of the duplicate portion as seen from the right of FIG. 10, but showing the bottom edge folded under for mailing.

The receipt portion 43 is perhaps best illustrated in FIG. 10. It will be noted that the receipt portion 43 (FIG. 10) is provided with a fold line 53 spaced from its top edge and aligned depthwise with fold line 44 of the deposit portion 42, whereby to provide a corresponding top stub 54. Aligned depthwise with the deposit portion 42, the receipt portion 43 is provided with a correspondingly located depositor section 46, a first depository section 47 immediately therebelow, a deposit section 50 at the opposite end, a second depository section 51 on the top stub 54 and a transverse strip 52 along the bottom edge.

The transverse strip 52 on the receipt portion 43 is adapted to receive machine-recorded acknowledgments or other information.

In addition, the receipt portion 43 is provided with another fold line 55 spaced above the bottom edge about which the bottom edge can be folded under as will be explained later.

A customer utilizing the ticket 40 of mailing unit Plan 3, will fill in his name and address and other pertinent information in the depositor section 46 on the deposit portion 42 and will fill in the entries in the deposit section 50. If not already imprinted by the bank, the customer will fill in the bank's name and address in each of the depository sections 47 and 51. This information will be reproduced by carbon in the appropriate corresponding sections on the receipt portion 43. Then, the customer will fold the top stubs 45 and 54 under along the fold lines 44 and 53 as is best shown in FIG. 9.

Figure 9:
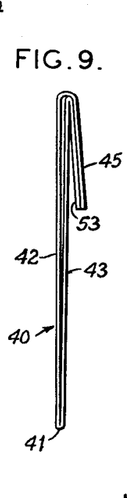
FIG. 9 is an end view as seen from the right of FIG. 7, but showing the top stubs folded under for mailing.

Then the folded ticket 40 of FIG. 9 is inserted into a bottom-open envelope of the type illustrated in FIG. 19. The depositor section 46 will show through the addressor window 30 while the depository section 46 will appear through the addressee window 27. Again, if desired, the envelope may include a third window 31 through which the information on transverse strip 52 on the deposit portion 42 will appear, for the purpose previously described with respect to the mailing unit of Plan 1.

The bank will process the customer's account, will remove the deposit portion 42 by tearing along the fold-tear line 41 and will return the receipt portion 43 to the customer. Specifically, the bank will fold the bottom edge of the receipt portion 43 under about the fold line 55 as is shown in FIG. 11. This folded receipt portion 43 is then inserted into a top-open envelope such as the type illustrated in FIG. 18. The depositor section 46 will appear through the addressee window 33 while the depository section 51 on the top stub 54 will appear through the addressor window 34.

Another deposit ticket referred to as 56 (FIG. 12) is utilized in a mailing unit designated Plan 4. This deposit ticket 56 consists of a single sheet folded in the middle to provide overlapping sheet parts and arranged so that the fold forms the bottom edge. The uppermost sheet part constitutes the deposit portion 57 while the underlying sheet part constitutes the receipt portion 60.

Figures 12, 13:
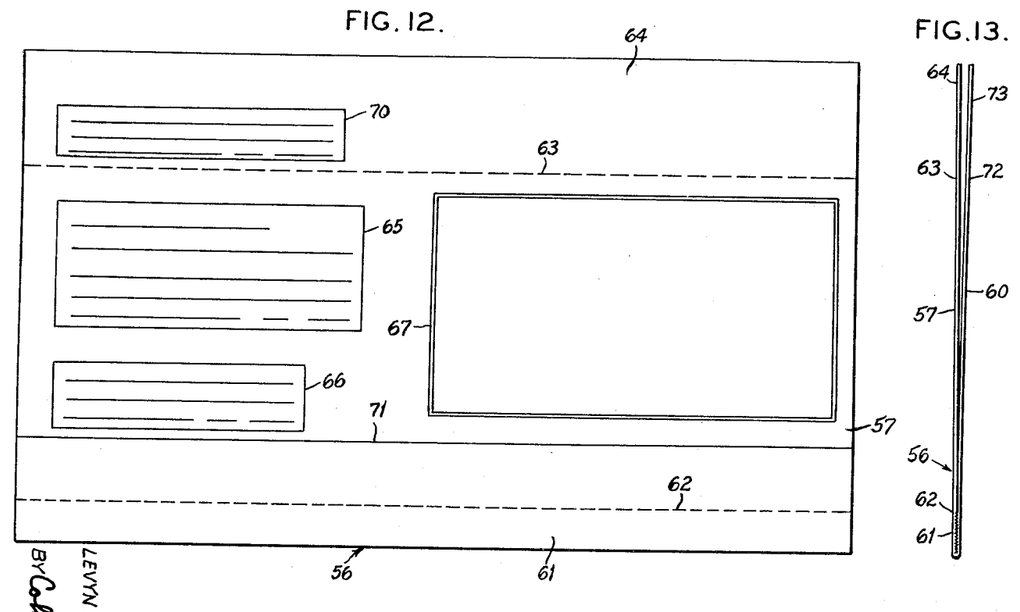
FIG. 12 is a top plan view of a deposit ticket used in a mailing unit hereinafter designated Plan 4.
FIG. 13 is an end view as seen from the right of FIG. 12.

The deposit portion 57 and the receipt portion 60 are secured together adjacent the bottom edge, as by glue, to provide a snap-out stub 61. The snap-out stub 61 is defined by a fold-tear line 62 extending transversely along the top of the stub on each of the deposit portion 57 and the receipt portion 60.

The deposit portion 57 is provided with a fold line 63 spaced from its top edge to provide a top stub 64. A depositor section 65 is provided at one end of the deposit portion 57 immediately below the fold line 63 adapted to receive the name and address of the depositor. Provided immediately below the depositor section 65 is a depository section 66 adapted to receive the name and address of the depository. Provided on the opposite end of the deposit portion 57 below the fold line 63 is a deposit section 67 adapted to receive deposit entries. Another depository section 70 is provided on the top stub 64 immediately above the depositor's section 65. A transverse strip 71 is provided on the deposit portion 57 below the depository section 66 and below the deposit section 67, yet immediately adjacent and above the fold-tear line 62 defining the snap-out stub 61. Again it will be noted that the transverse strip 71 on the deposit portion 57 is adapted to receive magnetic ink characters or other machine-recorded information.

Figure 15:
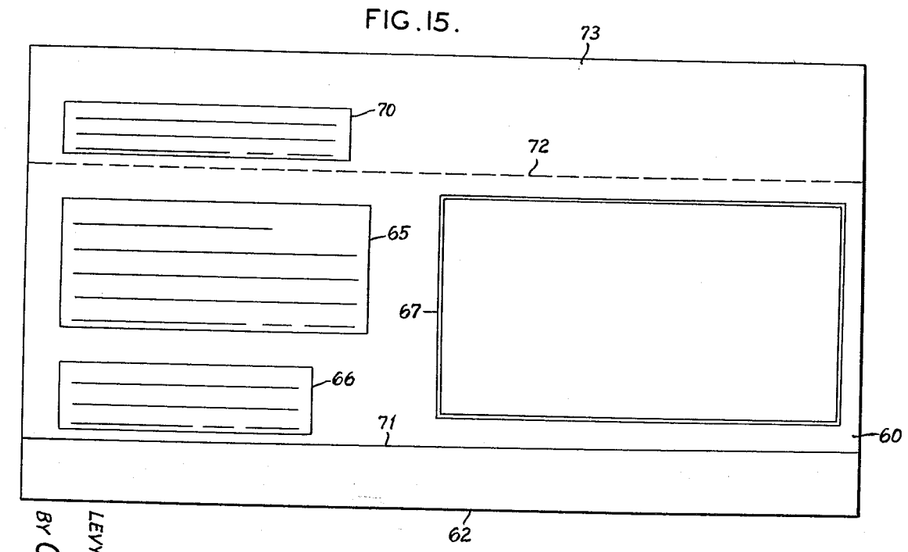
FIG. 15 is a top plan view of the duplicate portion of the Plan 4 deposit ticket.

The receipt portion 60 is perhaps best illustrated in FIG. 15. It will be noted that the receipt portion 60 includes a fold line 72 spaced from its top edge and aligned depthwise with fold line 63 on the overlying deposit portion 57 to provide a top stub 73. The receipt portion 60 includes a correspondingly aligned depositor section 65 at one end immediately below fold line 72, a depository section 66 below the depositor section 65, a deposit section 67 at the opposite end below fold line 72, another depository section 70 on top stub 73 above the depositor section 65, and a transverse strip 71 immediately below the depository section 66 and deposit section 67. The transverse strip 71 on the receipt portion 60 is adapted to receive machine-recorded acknowledgements or other information.

A customer utilizing the deposit ticket 56 of mailing unit Plan 4 will fill in his name and address in the depositor section 65 along with entries in the deposit section 67. If the bank's name and address is not printed in the depository sections 66 and 70, the customer will insert the bank's name and address in such sections. The information placed on the deposit portion 57 by the customer will be reproduced by carbon on the receipt portion 60 in the correspondingly located sections.

Figure 14:
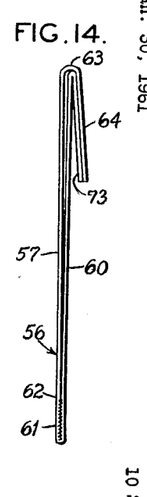
FIG. 14 is an end view as seen from the right of FIG. 12, but showing the top edge folded under for mailing.

The customer then folds the top stubs 64 and 73 of the deposit portion 57 and receipt portion 60 respectively about the fold lines 63 and 72 as is shown in FIG. 14. The folded ticket 56 of FIG. 14 is then inserted into an appropriate bottom-open envelope 26 of the general type illustrated in FIG. 19. The addressor window 30 is adapted to show the depositor section 65 on the deposit portion 57, and the addressee window 27 is adapted to show the depository section 66.

If desired, the envelope 26 may be provided with a third window 31 adapted to show the information appearing on the transverse strip 71 on deposit portion 57. The provision of a third window 31 will facilitate handling of the mail by the bank through the use of automatic sorters adapted to process the mail without removing the ticket 56 from the envelope.

Figure 16:
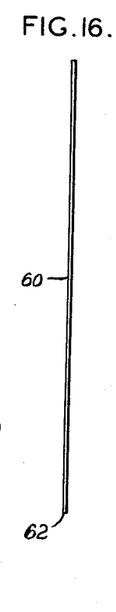
FIG. 16 is an end view of the duplicate portion as seen from the right of FIG. 15.

The bank removes both the deposit portion 57 and the receipt portion 60 by tearing off the snap-out stub 61 along the fold-tear line 62. After processing the customer's account, the duplicate or receipt portion 60 best shown in FIGS. 15 and 16 is simply placed in an appropriate envelope of the general type indicated at 32 in FIG. 18. Such an envelope 32 is provided with appropriately positioned addressee and addressor windows 33 and 34 adapted to show respectively the depositor section 65 and the depository section 70 on the receipt portion 60.

Figure 17:
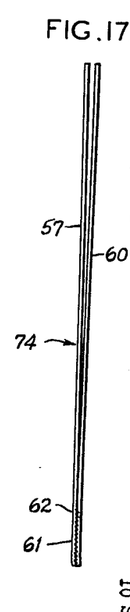
FIG. 17 is an end view of a deposit ticket used in a mailing unit hereinafter designated Plan 5, similar to FIG. 13 above, but showing that the ticket is formed of separate sheets.

Another deposit ticket referred to as 74 in FIG. 17 is adapted for use in a mailing unit designated Plan 5. This deposit ticket 74 is identical with the deposit ticket 56 illustrated in FIGS. 12 and 13 except that it is formed of two separate sheets instead of a single sheet. This sole difference is clearly illustrated in FIG. 17. The usage and functional advantages of this deposit ticket 74 is the same as that previously described with respect to ticket 56 in FIGS. 12–16 inclusive.

Figure 20:
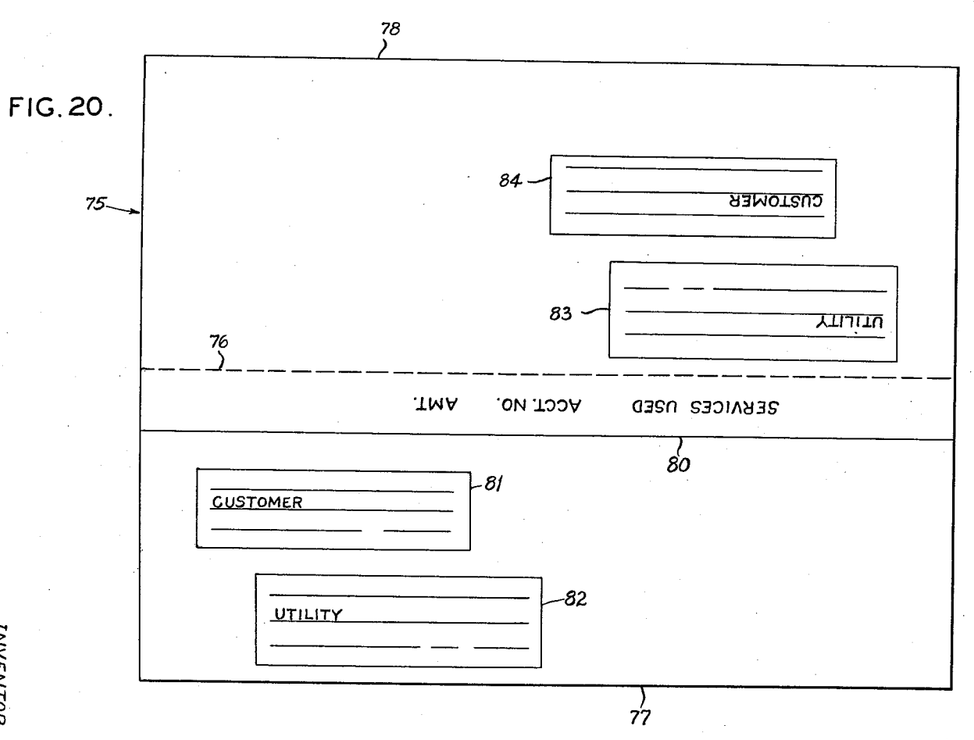
FIG. 20 is a top plan view of a ticket used in a mailing unit adapted for utilities.

A ticket referred to at 75 in FIG. 20 is especially adapted for use by a utility. Such ticket 75 is divided in half by a fold-tear line 76 to provide an original portion 77 and a duplicate portion 78.

On the original portion 77 immediately adjacent the fold-tear line 76 is a transverse strip 80 adapted primarily for use as a magnetic ink strip or a space to record information. At one end of the original portion 77 immediately below the transverse strip 80, there is provided a customer's section 81 adapted to receive the name and address of the customer. On the same end of the original portion 77 immediately below the customer's section 81, there is provided a utility section 82 adapted to receive the name and address of the utility. For reasons which will later appear, the information recorded on the transverse strip 80 is inverted relative to the information inserted in the customer and utility sections 81 and 82.

The duplicate portion 78 is provided with a utility section 83 at one end immediately adjacent the fold-tear line 76 adapted to receive the name and address of the utility. A customer's section 84 is provided on the duplicate portion 78 immediately below the utility section adapted to receive the name and address of the customer.

The utility folds the ticket 75 (which can be a monthly bill) along the fold-tear line 76, and then inserts the folded ticket in an appropriate envelope having an addressee and an addressor window corresponding in position to the customer and utility sections 84 and 83 respectively.

Figure 21:
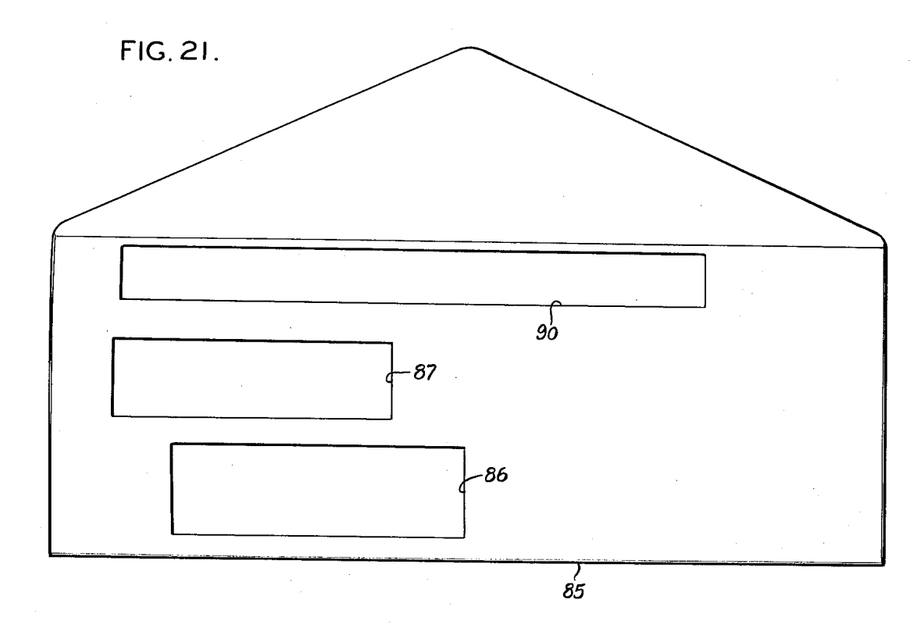
FIG. 21 is a top plan view of an envelope for the ticket shown in FIG. 20.

The customer will divide the duplicate portion 78 from the original portion 77 by tearing along fold-tear line 76, and then insert the original portion 77 in an appropriate envelope 85 shown in FIG. 21, together with his check. The envelope 85 is provided with an addressee window 86 adapted to show the utility section 82 on the original portion 77 and is provided with an addressor window 87 adapted to show the customer section 81. A third window 90 is provided along the top edge of envelope 85 through which appears the information provided on the transverse strip 80.

The use of this third window 90 and the transverse strip 80 allows the utility to utilize automatic sorter to process the mail without removing the original portion 77 from the envelope. The information supplied on the transverse strip 80 is inverted as mentioned previously so that it will appear right-side-up as the top edge of the envelope is fed through the automatic sorting machine.

Although the invention has been described by making detailed reference to a single preferred embodiment, and several modifications thereof, such detail is to be understood in an instructive, rather than any restrictive sense, many variants being possible within the scope of the claims hereunto appended.

I claim as my invention:

1. In a mailing unit, a ticket including an original portion and a duplicate portion attached together along one edge, the original portion including an addressee section at one end, and an addressor section spaced above the addressee section, the duplicate portion including an addressee section at one end, and an addressor section spaced above the last said addressee section, and a strip across at least one of said mailing unit portions along one edge, said strip being adapted for use as a magnetic ink strip or space to record information, and an envelope having an addressee window at one end adapted to show the addressee section on the mailing unit portion containing the said transverse strip, the envelope having an addressor window spaced above the said addressee window adapted to show the addressor window on the last said unit portion, and the envelope having an elongate third window extending transversely of and located adjacent one edge of the envelope adapted to show the said transverse strip.

2. In a mailing unit, a ticket including a deposit portion and a receipt portion attached together along one edge, said receipt portion underlying said deposit portion, said receipt portion being provided with a fold line spaced from its bottom edge, the deposit portion and said receipt portion each including in depthwise alignment a top stub, a depositor section on one end below the top stub adapted to receive the name and address of the depositor, a depository section on the same end spaced below the said depositor section adapted to receive the name and address of the depository, and a deposit section on the opposite end adapted to receive deposit entries, the receipt portion being provided with a depository section on its top stub; an envelope having an addressee window at one end adapted to show the said depository section on the deposit portion, and having an addressor window spaced above the said addressee window adapted to show the said depositor section on the deposit portion when the top stubs are folded under, and an envelope having an addressee window at one end adapted to show the said depositor section on the receipt portion, and having an addressor window spaced above the addressee window adapted to show the depository section on the top stub of the receipt portion when the deposit portion is removed and the bottom edge of the receipt portion is folded under along said fold line.

3. In a mailing unit, a ticket including a deposit portion and a receipt portion attached together along the top edge to provide a top stub, the deposit portion being provided with a fold-tear line along the bottom of said top stub, the receipt portion being provided with a fold line spaced from its bottom edge, the deposit portion including a depository section on one end of the top stub above said fold-tear line adapted to receive the name and address of the depository, the deposit portion and said receipt portion each including in depthwise alignment a depositor section on the same end below the top stub adapted to receive the name and address of the depositor, a second depository section on the same end spaced below the depositor section adapted to receive the name and address of the depository, and a deposit section on the opposite end adapted to receive deposit entries; an envelope having an addressee window at one end adapted to show the said second depository section on the deposit portion, and having an addressor window spaced above the said addressee window adapted to show the said depositor section on the deposit portion when the top stub is folded under; and an envelope having an addressee window at one end adapted to show the said depositor section on the receipt portion, and having an addressor window spaced above the said addressee window adapted to show the said first depository section on the said top stub when the deposit portion is torn off along the fold-tear line at the bottom of the top stub and when the bottom edge of the receipt portion is folded under along the said fold line.

4. In a mailing unit, a ticket including a deposit portion and a receipt portion attached together along the top edge to provide a top stub, the deposit portion being provided with a fold-tear line along the bottom of said top stub, the receipt portion being provided with a fold line spaced from its bottom edge, the deposit portion including a first depository section on one end of the top stub adapted to receive the name and address of the depository, the deposit portion and the said receipt portion each including in depthwise alignment a depositor section on the same end below the top stub adapted to receive the name and address of the depositor, a second depository section on the same end spaced below the depositor section adapted to receive the name and address of the depositor, a deposit section on the opposite end adapted to receive deposit entries, and a strip extending transversely below said second depository section and said deposit sections, the strip on said deposit portion being adapted for use as a magnetic ink strip or space to record information and the strip on said receipt portion being adapted to record acknowledgments or other information; an envelope having an addressee window at one end adapted to show the said second depository section on the deposit portion, having an addressor window spaced above the said addressee window adapted to show the said depositor section on the deposit portion, and having a third window extending transversely and located adjacent one edge of the envelope adapted to show the said transverse strip on the deposit portion when the top stub is folded under; and an envelope having an addressee window at one end adapted to show the said depositor section on the receipt portion, and having an addressor window spaced above the said addressee window adapted to show the said first depository section on the top stub when the deposit portion is torn along the fold-tear line at the bottom of the top stub and when the bottom edge of the receipt portion is folded under along the said fold line.

5. In a mailing unit, a ticket including a deposit portion, a receipt portion underlying said deposit portion, the deposit portion being provided with a fold-tear line spaced from its top edge, the deposit portion being attached to the receipt portion above the fold-tear line to provide a top stub, the receipt portion being provided with a fold line spaced from its bottom edge at substantially the same distance as the said fold-tear line is spaced from the top edge, the deposit portion including a first depository section on one end of the top stub above the said fold-tear line adapted to receive the name and address of the depository, the deposit portion and said receipt portion each including in depthwise alignment a depositor section on the same end below the top stub adapted to receive the name and address of the depositor, a second depository section on the same end spaced below the depositor section adapted to receive the name and address of the depository, and a deposit section on the opposite end adapted to receive deposit entries; an envelope having an addressee window at one end adapted to show the said second depository section on the deposit portion when the top stub is folded under, and having an addressor window spaced above the said addressee window adapted to show the said depositor section on the deposit portion; and an envelope having an addressee window at one end adapted to show the said depositor section on the receipt portion when the deposit portion is torn off along the fold-tear line at the bottom of said top stub and when the bottom edge of the receipt portion is folded under along the said fold line, and having an addressor window spaced above the said addressee window adapted to show the said first depository section on the top stub above the fold-tear line.

6. In a mailing unit, a deposit ticket having a fold-tear line that divides the ticket into a deposit portion and a receipt portion, said deposit portion being folded over said receipt portion about said fold-tear line, the deposit portion including a first depository seciton at one end adjacent the fold-tear line adapted to receive the name and address of the depository, the receipt portion including a first fold line spaced above said fold-tear line, the deposit portion and receipt portion each including in depthwise alignment a second fold line spaced from the top edge to provide a top stub, a depositor section on the same end above the said first depository section and below the said second fold line adapted to receive the name and address of the depositor, and a deposit section on the opposite end below the said second fold line adapted to receive deposit entries, the receipt portion including a second depository section on the top stub above the said second fold line and above the said second section adapted to receive the name and address of the depository; and an envelope having an addressee window at one end adapted to show the said first depository section on the deposit portion when the top stubs are folded under about said second fold lines, and having an addressor window at the same end above the addressee window adapted to show the said depositor section on the deposit portion; and an envelope having an addressee window at one end adapted to show the said depositor section on the receipt portion when the deposit portion is detached along the fold-tear line and when the bottom edge of the receipt portion is folded under about said first fold line, and having an addressor window at the same end above the addressee window adapted to show the said second depository section on the said top stub of the receipt portion.

7. In a mailing unit, a deposit ticket having a fold-tear line that divides the ticket into a deposit portion and a receipt portion, said deposit portion being folded over said receipt portion about said fold-tear line, the deposit portion and the receipt portion each including in depthwise alignment a first fold line spaced from the top edge to provide a top stub, a depositor section at one end below the said first fold line adapted to receive the name and address of the depositor, a first depository section at the same end below said depositor section adapted to receive the name and address of the depository, a second depository section on the top stub above the said first fold line and above the said depositor section adapted to receive the name and address of the depository, and a deposit section on the opposite end below the said first fold line adapted to receive deposit entries, the receipt portion including a second fold line spaced above said fold-tear line; an envelope having an addressee window at one end adapted to show the said first depository section on the deposit portion when the top stubs are folded under about said first fold lines, and having an addressor window at the same end above the addressee window adapted to show the said depositor section on the deposit portion; and an envelope having an addressee window at one end adapted to show the said depositor section on the receipt portion when the deposit portion is detached along the fold-tear line and when the bottom edge of the receipt portion is folded under about said second fold line, and having an addressor window at the same end above the addressee window adapted to show the said second depository section on the said top stub of the receipt portion.

8. In a mailing unit, a deposit ticket having a fold-tear line that divides the ticket into a deposit portion and a receipt portion, said deposit portion being folded over said receipt portion about said fold-tear line, the deposit portion and receipt portion each including in depthwise alignment a first fold line spaced from the top edge to provide a top stub, a depositor section at one end below the top stub adapted to receive the same and address of the depositor, a first depository section at the same end below said depositor section adapted to receive the name and address of the depository, a second depository section on the top stub above the depositor section adapted to receive the name and address of the depository, a deposit section on the opposite end below the top stub adapted to receive deposit entries, and a transverse strip extending below said first depository section and said deposit section, the strip on the deposit portion being adapted for use as a magnetic ink strip or space to record information and the strip on said receipt portion being adapted to record acknowledgments or other information, the receipt portion including a second fold line spaced above said fold-tear line; an envelope having an addressee window at one end adapted to show the said first depository section on the deposit portion when the top stubs are folded under, having an addressor window at the same end above the addressee window adapted to show the said depositor section on the deposit portion, and having a third window extending transversely and located adjacent one edge of the envelope adapted to show the said transverse strip on said deposit portion; and an envelope having an addressee window at one end adapted to show the said depositor section on the receipt portion when the deposit portion is detached along the fold-tear line and when the bottom edge of the receipt portion is folded under about said second fold line, and having an addressor window at the same end above the addressee window adapted to show the said second depository section on the top stub of the receipt portion.

9. In a mailing unit, a ticket including a deposit portion, a receipt portion underlying said deposit portion, said deposit portion and receipt portion having their bottom margins secured together to provide a bottom stub, and being provided with tear lines along the top of said bottom stub, said deposit portion and said receipt portion each including in depthwise alignment a fold line spaced below the top margin to provide a top stub, a depositor section on one end just below said top stub adapted to receive the name and address of the depositor, and a deposit section on the opposite end between the top and bottom stubs adapted to receive deposit entries, the deposit portion including a first depository section below the said depositor section on the same end adapted to receive the name and address of the depository, the receipt portion including a second depository section on the top stub above the said depositor section adapted to receive the name and address of the depository; an envelope having an addressee window at one end adapted to show the said first depository section on the deposit portion when the top stubs are folded under about said fold lines, and having an addressor window at the same end above the addressee window adapted to show the said depositor section on the deposit portion; and an envelope having an addressee window at one end adapted to show the said depositor section on the receipt portion when the bottom stub is detached along the tear lines, and having an addressor window at the same end above the addressee window adapted to show the said second depository section on the top stub of the receipt portion.

10. In a mailing unit, a ticket including a deposit portion, a receipt portion underlying said deposit portion, said deposit portion and receipt portion having their bottom margins secured together to provide a bottom stub, and each portion being provided with a tear line along the top of said bottom stub, said deposit portion and said receipt portion each including in depthwise alignment a fold line spaced below the top margins to provide a top stub, a depositor section on one end just below said top stub adapted to receive the name and address of the depositor, a first depository section on the same end below said depositor section and above said bottom stub adapted to receive the name and address of the depository, a second depository section on the same end on the top stub adapted to receive the name and address of the depository, and a deposit section on the opposite end between the top and bottom stubs adapted to receive deposit entries; a first envelope having an addressee window at one end adapted to show the said first depository section on the deposit portion when the top stubs are folded under about said fold lines, and having an addressor window at the same end above the addressee window adapted to show the envelope having an addressee window at one end adapted to show the said depositor section on the receipt portion when the bottom stub is detached along the tear lines, and having an addressor window at the same end above the addressee window adapted to show the said second depository section on the top stub of the receipt portion.

11. In a mailing unit, a ticket having a fold-tear line dividing the ticket into an original portion and a duplicate portion; the duplicate portion including an addressee section at one end adapted to receive the name and address of the customer, and an addressor section at the same end above the addressee section adapted to receive the name and address of the utility; the original portion including a transverse strip immediately adjacent said fold-tear line adapted for use as a magnetic ink strip or space to record information, an addressor section at one end below said transverse strip adapted to receive the name and address of the customer, and an addressee section at the same end below the said addressor section adapted to receive the name and address of the utility, the information recorded in said transverse strip being inverted relative to the information placed in said addressee and addressor sections on the original portion; and an envelope having an addressee window and an address window at one end adapted to show selectively the addressee sections and the addressor sections, and including an elongate third window extending transversely of and located adjacent one edge of the envelope adapted to show the said transverse strip when the original portion is detached from the duplicate portion along said fold-tear line and the original portion is placed in said envelope.

12. In a mailing unit, a ticket including a deposit portion and a receipt portion attached together along one edge, said receipt portion underlying said deposit portion, the deposit portion and said receipt portion each including in depthwise alignment a top stub, a depositor section on one end below the top stub adapted to receive the name and address of the depositor, a depository section on the same end spaced below the said depositor section adapted to receive the name and address of the depository, a deposit section on the opposite end adapted to receive deposit entries, a transverse strip extending across said deposit portion below said depository and deposit sections adapted for use as a magnetic ink strip or space to record information, and a corresponding strip extending across the receipt portion adapted to receive acknowledgments or other information; and an envelope having an addressee window at one end adapted to show the said depository section and having an addressor window spaced above the said addressee window adapted to show the said depositor section when the top stubs are folded under, and having an elongate third window extending transversely and located adjacent one edge of the envelope adapted to show the said transverse strip on the deposit portion.

13. In a mailing unit, a ticket including a deposit portion, a receipt portion underlying said deposit portion, said deposit portion and receipt portion having their bottom margins secured together to provide a bottom stub, and each portion being provided with a tear line along the top of said bottom stub, said deposit portion and said receipt portion each including in depthwise alignment a fold line spaced below its top margin to provide a top stub, a depositor section on one end just below said top stub adapted to receive the name and address of the depositor, a first depository section on the same end below said depositor section and above said bottom stub adapted to receive the name and address of the depository, a second depository section on the same end on the top stub adapted to receive the name and address of the depository, a deposit section on the opposite end between the top and bottom stubs adapted to receive deposit entries, and a transverse strip extending below said first depository section and said deposit section and extending above said bottom stub, the strip on the deposit portion being adapted for use as a magnetic ink strip or space to record information and the strip on said receipt portion being adapted to record acknowledgements or other information; a first envelope having an addressee window at one end adapted to show the said first depository section on the deposit portion when the top stubs are folded under about said fold lines, having an addressor section at the same end above the addressee window adapted to show the said depositor section on the deposit portion, and having an elongate third window extending transversely and located adjacent one edge of the envelope adapted to show the said transverse strip on said deposit portion; and a second envelope having an addressee window at one end adapted to show the said depositor section on the receipt portion when the bottom stub is detached along the tear lines and having an addressor window at the same end above the addressee window adapted to show the said second depository section on the top stub of the receipt portion.

References Cited in the file of this patent

UNITED STATES PATENTS

| | | |
|---|---|---|
| 701,839 | Callahan | June 10, 1902 |
| 2,964,232 | Schuessler | Dec. 13, 1960 |